3,667,964
ESTERS OF 1,3 DIOLS AND 1,3,5 x-POLYOLS AS ADDITIVES FOR BAKED GOODS
John W. Frankenfeld, Atlantic Highlands, N.J., and Marcus Karel, Newtonville, and Theodore P. Labuza, North Tewksbury, Mass., assignors to Esso Research and Engineering Company
No Drawing. Filed Apr. 1, 1970, Ser. No. 24,796
Int. Cl. A21d 2/16
U.S. Cl. 99—90 P          10 Claims

ABSTRACT OF THE DISCLOSURE

Baked food additives which comprise certain esters of polyalcohols, such as esters of 1,3-diols and 1,3,5 x-polyols, are excellent dough conditioners, anti-staling agents and preservatives. The present invention is concerned generally with high quality baked food compositions and is more specifically concerned with additive materials for addition to baked foods, which materials comprise particular esters of particular diols and polyols.

---

The present invention is concerned generally with high quality baked food compositions and is more specifically concerned with additive materials for addition to baked foods, which materials comprise particular esters of particular diols and polyols.

It is known in the baking art to incorporate various additives in yeast-leavened baked goods, such as breads, cakes, rolls and the like, to impart desirable properties to the final product. Such additives include softeners to improve texture or anti-staling agents and anti-microbial agents to inhibit microbiological growth and thereby increase the shelf life of the baked product. It is also known in the art to add conditions to improve the mixing properties of the dough.

It has now been discovered that certain esters of particular aliphatic diols and polyols are excellent additives to baked goods. The baked products which contain these esters have excellent anti-staling and mold inhibiting properties and, therefore, greatly increased shelf life. In addition, incorporating these esters into the formulations prior to baking improves the mixing tolerance and stability of the dough. It has also been discovered that these esters of aliphatic 1,3-diols and 1,3,5, x-polyols are energy-dense compounds which are nontoxic and completely metabolized. They are excellent sources of dietary energy (calories). Hence, they actually improve the nutritional qualities of the baked product. At their effective levels, the esters impart no undesidarble characteristics to the product nor do they interfere with the action of other additives.

These esters of aliphatic 1,3-diols are synthesized easily, and are readily metabolized. These materials have several advantages over usual energy sources in that they are higher in caloric density than carbohydrates and proteins and are more stable than fats and thus may be used as replacements for natural foods. These materials are also easily formulated into bread products. Since they are produced by chemical means from readily obtainable starting materials, the esters of 1,3-diols and 1,3,5, x-polyols have marked advantages in that they are available at stable prices and in consistent quantities. They also may be produced readily in localities where arable land for grazing or cultivation is scarce.

Bread and baked goods as used in the present application is a food product made of flour or meal with liquid, shortening and leavening, which is kneaded, shaped, allowed to rise and baked. Thus, the bread product of the present invention is one where usually prior to baking the dough is treated to render it light and porous. This may be secured by beating, or with yeast or leavening or a baking powder.

The particular polyols from which the esters of the present invention are derived are linear polyols which contain from about 3 to 15 carbon atoms in the molecule, preferably about 5 to 10 carbon atoms in the molecule. Polyols containing less than 3 carbons are low in calories and are more toxic and are not well metabolized. The polyols contain hydroxy groups on at least the first and third carbon atoms or on the first, third, fifth, etc., carbon atoms. It is this 1,3-dihydroxy or 1,3,5, x-polyhydroxy configuration which renders these compounds nontoxic and safe to use in food products.

While the diols may be prepared by any satisfactory method, the following methods are very satisfactory for their preparation.

The Reformatsky reaction followed by reduction:

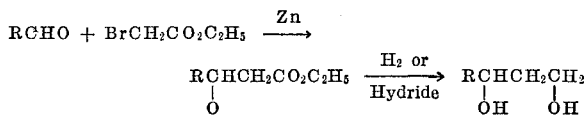

or by means of the Prins reaction of formaldehyde and the appropriate α olefin or mixture of α olefins:

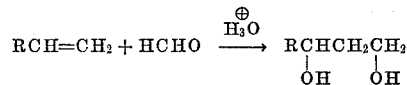

A 1,3,5, x-polyol, 1,3,5-hexanetriol, has been synthesized by the following sequence of reactions:

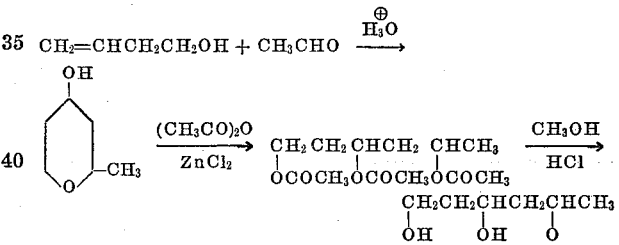

Other 1,3,5, x-polyols (polyvinyl alcohols) of medium molecular weight may also be obtained by selective polymerization of acetaldehyde followed by reduction:

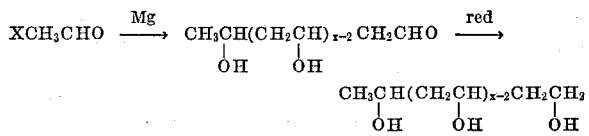

The esters are made from these diols by reacting them with fatty acids or fatty acid derivatives which contain from about 2 to 20 carbon atoms in the molecule, preferably 3 to 18 carbon atoms, such as about 8 carbon atoms in the molecule. In general, the esters have the following configuration:

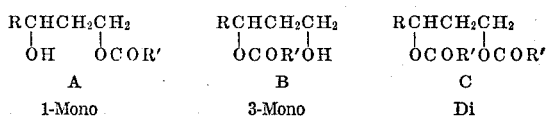

where R represents a straight chain alkyl group containing from 0 to 12 carbons and R' represents the alkyl portion of an aliphatic carboxylic acid, saturated or unsaturated, containing 2 to 20 carbon atoms. The compounds may be varied in molecular weight as long as the 1,3-dioxy configuration is preserved. These esters are conveniently prepared either from the diols by reaction with the appropriate acid, acid anhydride or acid chloride:

(1)
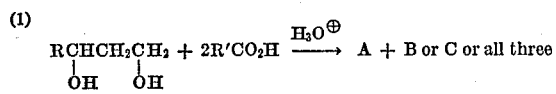
$$RCHCH_2CH_3 + 2R'CO_2H \xrightarrow{H_3O^\oplus} A + B \text{ or } C \text{ or all three}$$

(2)
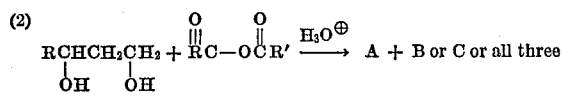
$$RCHCH_2CH_3 + R\overset{O}{\overset{\|}{C}}-O\overset{O}{\overset{\|}{C}}R' \xrightarrow{H_3O^\oplus} A + B \text{ or } C \text{ or all three}$$

(3)
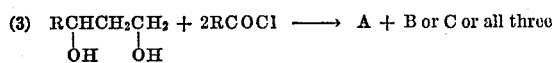
$$RCHCH_2CH_3 + 2RCOCl \longrightarrow A + B \text{ or } C \text{ or all three}$$

or, in the case of the diester, C, by means of the Prins reaction of formaldehyde and an α-olefin in the presence of the desired acid:

(4)
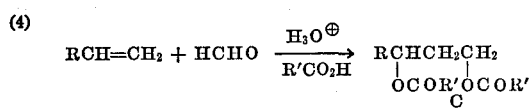
$$RCH=CH_2 + HCHO \xrightarrow[R'CO_2H]{H_3O^\oplus} RCHCH_2CH_2$$

The best materials are those with 5–8 carbon hydrocarbon "tail" in either the diol or ester portion of the compound combined with a concentration of polar groups in another part of the molecule, as for example, 1,3-octanediol - 1-monopropionate or 1,3-butanediol-1-monooctanoate. Some especially valuable esters are shown in the following Table I.

TABLE I.—PROPERTIES OF SOME 1,3-DIOL ESTERS

| Compound | BP, °C. (mm.) | Rat feeding results, caloric density (kcal./g.) | | |
|---|---|---|---|---|
| | | Observed | Calculated | Percent utilized |
| 1,3-butanediol:[1] | | | | |
| 1-monopropionate | | | | |
| 1-monooctanoate | 90–95(0.3) | | | |
| 1-monopalmitate | [2] 29–31 | | | |
| 1,3-hexanediol: | | | | |
| 1-monoacetate | 59–62(0.15) | 6.7 | 7.0 | 95 |
| 1-monooctanoate | 117–122(0.3) | 8.4 | 9.0 | 95 |
| 1-monopalmitate | 124–126(0.2) | 7.3 | 9.3 | 78 |
| 1,3-heptanediol: | | | | |
| 1-monooctanoate | 85–90(1.0) | | | |
| 1-monopalmitate | [2] 38–39 | | | |
| 1,3-octanediol: 1-monopropionate | 83–86(0.3) | | | |

[1] Parent diol.
[2] Melting point.

The nutritive value of these esters is apparent from the rat feeding results shown in Table I. These compounds are nontoxic and completely metabolized.

The "observed metabolic energy" values shown in Table I were obtained by feeding test groups, of 5–10 rats each, various amounts of several high energy supplements including the diol esters. The basal diets in each case contained sufficient protein, salts, vitamins and minerals to support normal growth. However, the basal diets were deficient in energy (calories). This deficit was, in part, overcome by adding varying amounts of the polyols or of natural energy sources of known caloric densities such as lard, sucrose, or glucose. Curves were drawn by plotting the average change in body weight of test animals against the amount of high energy supplement tested and straight lines were obtained. The slopes of the lines are measures of the energy values of the test compounds. The values given in Table I were obtained by measuring the slopes of the lines of the test compounds and comparing them with the slopes of the lines obtained with the standards (lard, glucose or sucrose whose caloric densities are 9.3 kcal./gm., 3.8 kcal./gm. and 4.1 kcal./gm., respectively). The "observed metabolic energy" values were calculated according to the formula:

$$\text{kcal./gm. of unknown} = \frac{\text{Slope of unknown line}}{\text{Slope of standard line}} \times \text{kcal/gm. of standard}$$

The toxicity of diol esters is compared with that of known bread additives, used as preservatives, in Table II. It is apparent that the esters are less toxic and therefore can be used at higher levels thus providing a distinct advantage over present additives.

TABLE II

Toxicity data

| Preservative: | Oral LD$_{50}$ (rats) [1] |
|---|---|
| Diol esters (propionates and higher) | >20 g./kg. |
| Sorbic acid [2] | 10 g./kg. |
| Sodium sorbate [2] | 6–7 g./kg. |
| Propionic acid [3] | 4 g./kg. |
| Sodium benzoate [2] | 2–3 g./kg. |

[1] LD$_{50}$=lethal dose for 50% kill.
[2] Source: Handbook of Toxicology, vol. I, W. S. Spector, ed., WADC Tech. Rept. #55–16, National Academy of Sciences, National Research Council (1955).
[3] Source: H. F. Smyth et al., Am. Ind. Hyg. Assoc. J., 23, 95 (1962).

LD$_{50}$ values are a common measure of the toxicity of a compound. These LD$_{50}$ values represent the lethal dose for a 50% kill of the animals tested per unit weight of the animals. The higher the LD$_{50}$ value, the lower the toxicity.

The usefulness of the diol esters as preservatives, anti-staling agents and dough conditioners is illustrated in the following examples.

EXAMPLE 1

In order to demonstrate the effectiveness of the present additives as anti-staling agents, and mold inhibitors, bread was baked with and without added compounds as follows:

The "sponge" method of baking was used, which consisted of the following steps:

(1) A "sponge" was prepared by mixing the ingredients listed below:

| | Grams |
|---|---|
| Flour | 225 |
| Salt (NaCl) | 0.3 |
| Yeast food (NH4Cl) | 0.15 |
| Baker's yeast | 7.15 |
| Water | 100 |

All of the above ingredients were mixed for two minutes in the mixing bowl of a standard experimental mixed (Farinograph) equipped with instruments for measuring and recording of resistance of the dough to mixing.

(2) After mixing, the "sponge" was allowed to ferment for 3.5 hours, at 86° F.

(3) After fermentation, the additional ingredients of the dough were added as follows:

Sponge was placed in the mixing bowl, and added to it by mixing for 0.5 minute were:

| | Grams |
|---|---|
| Flour | 75 |
| Salt | 5.7 |
| Sugar (sucrose) | 18 |
| Non-fat milk solids | 12 |

(4) 50 ml. of water were then added. When additives were used they were added with this water, after mixing in the water to form a solution, or dispersion, depending on additive solubility. The additives were added in quantities of 1.5 g. (0.5% level).

(5) The dough was then mixed at low speed for 1.5 minutes.

(6) Mixing was stopped and the shortening, hydrogenated vegetable shortening, 9 grams were added.

(7) Mixer was started at high speed, and after 2–3 minutes additional water was added to give a standardized resistance to mixing. The amount added was designed to give a maximum consistency of 500 Brabender Units as measured with Farinograph. This procedure is in accordance with test baking practice.

Mixing was continued for 3 minutes past the time at which maximum consistency was reached. Typically, a total mixing time of 12 minutes resulted.

(8) Dough was taken from the mixing bowl and held in greased pots at 86° F. for one hour.

(9) Dough was divided into 150 gram portions rounded, "rested" for 10 minutes and "pup loaves" formed using standard equipment (Brabender Extensograph).

(10) The loaves were then placed in greased "pup pans" and proofed to constant height of ⅜″ above the pan line in a box maintained at 96 to 98° F. at 80 to 90% R.H.

(11) After proofing, the loaves were baked in rotary baking oven at 425° F. The baking time was usually 20 minutes. The loaves were evaluated in accordance with a standard scoring procedure. The overall score [1] for bread without additives was 88.5 and with the additive 88. Thus, prior to storage both breads were highly acceptable.

The loaves thus obtained were stored for several days and then evaluated for degree of staling. Loaves with various additives were compared with controls. The degree of staling was determined by measuring, with a sensitive cathetometer, the depth of penetration by a plunger into approximately 1 cm. thick slices of test loaves when known weights were placed on the plunger. The greater the penetration, the softer the bread. The results are given in Table III.

TABLE III.—ANTI-STALING PROPERTIES OF A DIOL ESTER [1]

| Additive to bread dough | Penetration of 500 g. plunger [2] | |
|---|---|---|
| | First day | After 3 days storage |
| None | 0.63 | 0.21 |
| 1,3-octanediol-1-monopropionate, 0.5% by weight | 0.53 | 0.40 |

[1] This is a test designed to evaluate the softness ("staleness") of breads. The greater the plunger penetration, the softer the bread.
[2] Cm. penetration/cm. of slice thickness—at specified conditions.

In addition, the slices were tasted and it was judged that slices containing the additive were much softer and had a fresher texture.

The loaves were observed during storage and it was noted that bread containing no additives showed very extensive mold growth within 6 days after baking. The breads containing additives showed no mold growth for 11 days.

It is readily apparent that 1,3-octanediol-1 monopropionate is an excellent anti-staling agent.

EXAMPLE 2

Bread doughs were mixed according to Example 1. During the mixing process the rheological properties of the doughs were measured using the "Farinograph" and "Extensograph" tests. The results are shown in Table IV where the test compounds are contrasted with control loaves.

[1] Bread Score Report, American Institute of Baking.

The value of these esters in improving the properties of doughs is apparent from the data in Table IV. The best compound, 1,3-octanediol-1-monopropionate, was superior to controls in all the tests shown (i.e., all deviations from from the controls are in a desirable direction). Especially important are the increases in stability and decreases in mixing tolerance index afforded by these additives since they indicate improved tolerance of the treated dough to processing abuses. The treated doughs also show improved tensile properties (high values for "energy" and resistance to extension ratio).

When incorporated into bread doughs at the 0.5% level, the esters are fully compatible with other ingredients and impart no undesirable taste, odor, or other characteristics to breads baked from the treated doughs.

TABLE IV.—EFFECTS OF SELECTED COMPOUNDS ON RHEOLOGICAL PROPERTIES OF DOUGH

| | Mixing properties (Farinograph test) | | | Tensile properties (Extensograph test) | |
|---|---|---|---|---|---|
| Additive (at 0.5 g./100 g. flour) | Stability (minutes) | Mixing tolerance index (Brabender units) | 20 minute drop (Brabender units) | "Energy" area under extensogram (arbitrary units) | Resistance to extension ratio |
| None | 10 | 38 | 60 | 21.9 | 1.26 |
| 1,3-butanediol-1-monopropionate | 10.3 | 30 | 60 | 26.8 | 2.16 |
| 1,3-butanediol-monopalmitate | 16 | 20 | 30 | 27.3 | 1.68 |
| 1,3-heptanediol-monooctanoate | 14 | 30 | 35 | 26.7 | 1.45 |
| 1,3-heptanediol-monopalmitate | 11 | 38 | 50 | 24.0 | 1.15 |
| 1,3-octanediol-1-monopropionate | 17.5 | 15 | 15 | 28.2 | 2.02 |

EXAMPLE 3

In order to determine the effectiveness of the additive, 1,3-octanediol-1-monopropionate, at a lower concentration, a baking test was conducted under conditions identical with those in Example 1, with the following exceptions:

(a) The sugar ingredient of the dough was composed of 12 grams of sucrose and 12 grams of glucose.

(b) 1,3-octanediol - 1 - monopropionate was added in quantity of 1 gram (0.33% level).

Evaluation of loaves on the first day after baking showed the bread with the additive to have a score of 92 compared to a score of 86 for the control loaf. The loaves were then stored and evaluated for staling and for mold development. The staling test described in Example 1 gave results shown in Table V.

TABLE V.—ANTI-STALING PROPERTIES OF A DIOL ESTER

| Additive to bread dough | Penetration of 500 g. plunger [1] | |
|---|---|---|
| | First day | After 3 days storage |
| None | 0.66 | 0.24 |
| 1,3-octanediol-1-monopropionate, 0.33% by weight | 0.59 | 0.39 |

[1] Cm. penetration/cm. of slice thickness—at specified conditions.

Taste tests on breads after 3 and 4 days of storage showed that breads containing the additive were softer and had a better texture. Mold growth was profuse on the control breads in 6 days, and a few mold colonies appeared on breads containing the additive in 8 days.

It is evident that in concentrations of 0.33% 1,3-octanediol-1-monopropionate is an effective anti-staling agent, and has some anti-mold activity.

EXAMPLE 4

In order to determine the effectiveness of the diol esters in suppressing mold growth, the following microbiological tests were conducted.

Nutrient broth was used as the basal nutrient medium for the growth of all microorganisms tested. Five ml. of nutrient broth medium (Difco Co.) were placed in 18 mm. x 150 mm. test tubes and the basal medium sterilized with steam at 15 p.s.i. for 15 minutes. After cooling, a sufficient amount of the various compounds were added to the basal medium to give the concentrations used. Normally a final concentration of 0.2, 1, and 2% were used.

After mixing the chemicals with nutrient broth, the tubes were inoculated with the various test microorganisms. The test microorganisms were grown 24 hours earlier in nutrient broth and 1 drop of the dense microbial suspension was added to the tubes.

The tubes containing the chemicals and microorganisms were then incubated at the optimal growth temperature reported for each microorganism tested. Either 37° C. or 30° C. was used. Growth in control tubes, as well as those containing chemicals, was observed visually. After a suitable incubation period, a small aliquot of the test solution was streaked on an agar plate. This was done in order to confirm the visual readings of the presence of microbial growth.

The results are shown in Table V. The "minimum effective concentration" is the lowest concentration of preservative which effectively prevented mold growth under the conditions of the test. The lower the "minimum effective concentration" the better the preservative. The organisms used are common molds often found in baked goods. Also included in this test were potassium sorbate and calcium propionate, two commonly used commercial mold inhibitors. Many of the diol esters were considerably more effective against a greater variety of molds than either of the commercial chemicals. In addition, as shown above, the esters are less toxic and can be used at higher levels in the baked product if desired. Thus, these new compounds represent a significant improvement over currently used preservatives.

It is apparent from the foregoing that the compounds claimed are safe, effective conditioners which improve the mixing and stability properties of doughs without adversely affecting product quality or otherwise interfering with the effectiveness of other additives. In addition, they act as antistalants and inhibit mold growth. Thus, a single diol ester performs the functions of several chemicals now in use. As a result they are very useful multi-purpose additives for the preparation of high quality baked goods.

TABLE V.—EFFECTIVENESS OF DIOL ESTERS AGAINST COMMON MOLDS

| Compound | Minimum effective concentration (percent) against— | | | | | |
|---|---|---|---|---|---|---|
| | Trichoderma 12688 | Botrytis 9435 | Fusarium 10911 | B. fulva | A. niger | A. flavus |
| 1,3-octanediolmonopropionate | 0.2 | 0.2 | 0.2 | 0.2 | 0.2 | 0.2 |
| 1,3-butanedioldiproprionate | 0.2 | 0.2 | 1 | 0.2 | 0.2 | 0.2 |
| 1,3-pentanediolmonooctanoate | 0 | 0 | 0 | 0 | 0.2 | 0 |
| Potassium sorbate | 2 | 0.2 | 2 | 2 | 2 | 2 |
| Calcium propionate | + | 1% | + | + | + | + |

Symbols: + = no effect at 2%; 0 = not tested.

What is claimed is:

1. Baked composition having anti-staling, mold inhibiting and dough conditioning properties containing from about 0.2 to 5.0% by weight, based upon the weight of the dry flour, of at least a mono-ester of an aliphatic polyol, the polyol from which said ester is derived having from 3 to about 15 carbon atoms in the molecule and hydroxy groups on alternate carbon atoms and at least the first and third carbon atoms, said ester having acyl groups of from about 2 to 20 carbon atoms.

2. Composition as defined by claim 1 wherein said polyol contains from about 3 to 10 carbon atoms in the molecule.

3. Composition as defined by claim 1 wherein said ester comprises 1,3-octanediol-1-monopropionate.

4. Composition as defined by claim 1 wherein said ester is a mono-ester and said polyol is a 1,3-diol.

5. Method of producing a high quality baked composition which comprises adding to flour or meal from about 0.2 to 5.0% by weight of at least a mono-ester of an aliphatic 1,3-diol, said diol from which said ester is derived having from about 3 to 15 carbon atoms in the molecule and said ester having acyl groups of from about 2 to 20 carbon atoms, kneading the composition and thereafter baking at a temperature in the range from about 300° to about 450° F.

6. Method as defined by claim 5 wherein said diol ester comprises 1,3-butanediol-1-monopropionate.

7. Method as defined by claim 5 wherein said diol ester comprises 1,3-butanediol-1-monopalmitate.

8. Method as defined by claim 5 wherein said diol ester comprises 1,3-heptanediol-1-monooctanoate.

9. Method as defined by claim 5 wherein said diol ester comprises 1,3-heptanediol-1-monopalmitate.

10. Method as defined by claim 5 wherein said diol ester comprises 1,3-octanediol-1-monopropionate.

References Cited

UNITED STATES PATENTS 3,479,189   11/1969   Vrang et al. _____ 99—91 X

A. LOUIS MONACELL, Primary Examiner

J. R. HOFFMAN, Assistant Examiner

U.S. Cl. X.R.

99—91, 92, 150 R